April 6, 1926.  
F. H. LESLIE  
WELDING APPARATUS  
Filed April 11, 1925  
1,579,721  
2 Sheets-Sheet 1
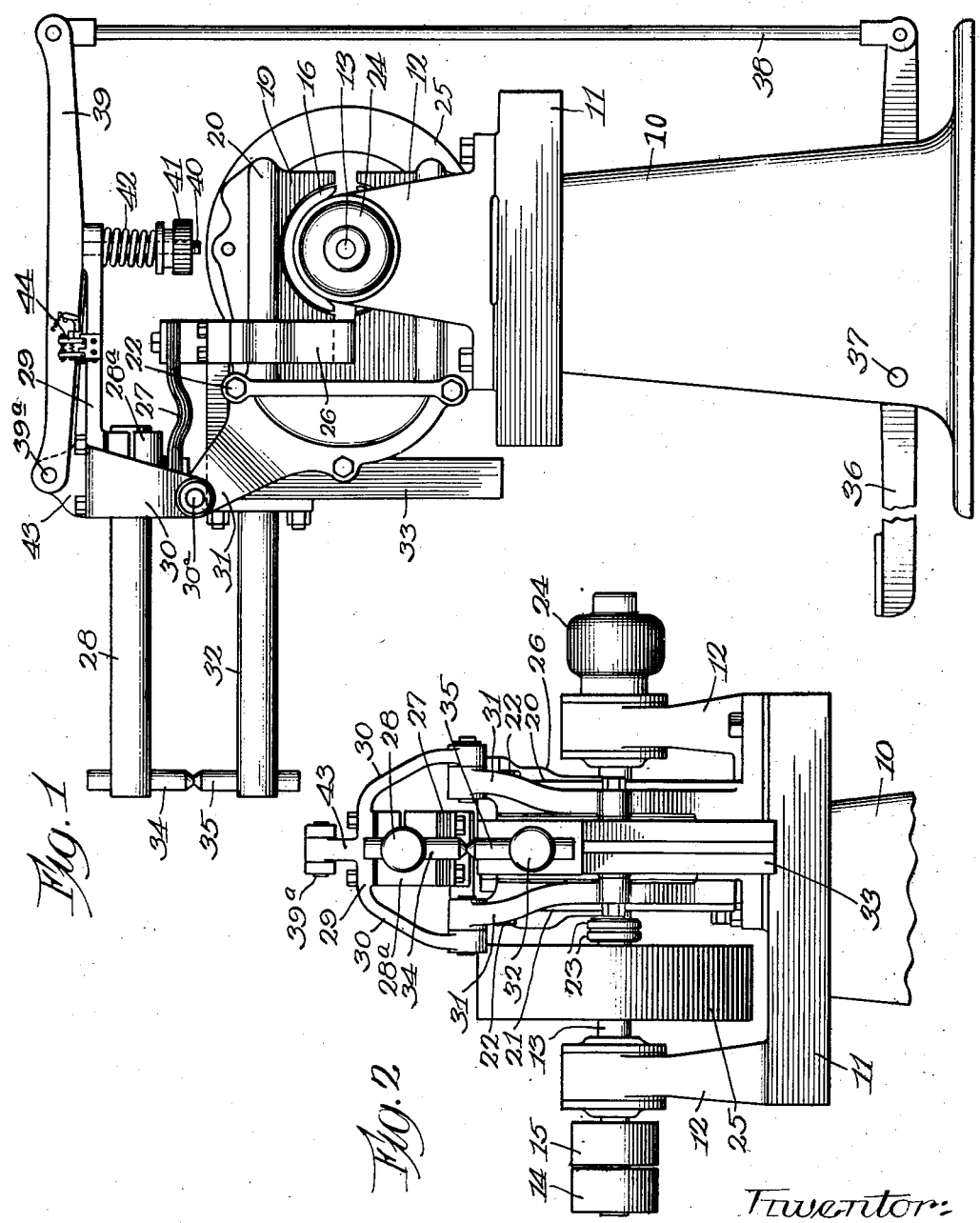

April 6, 1926. 1,579,721
F. H. LESLIE
WELDING APPARATUS
Filed April 11, 1925 2 Sheets-Sheet 2
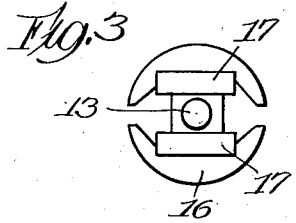
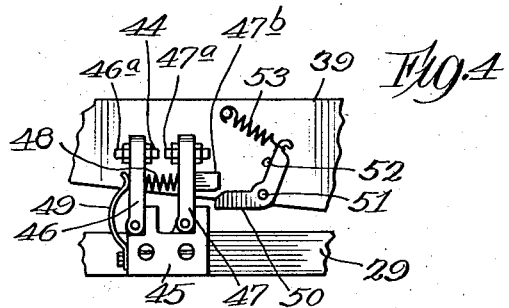
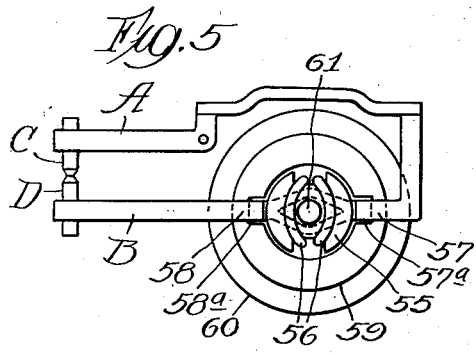
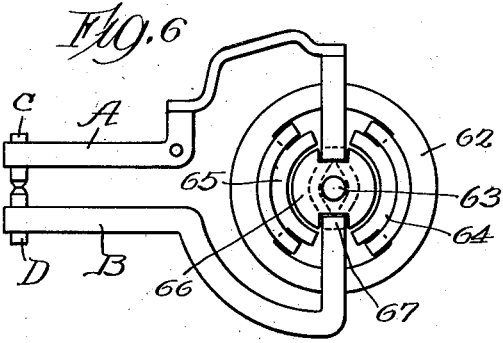
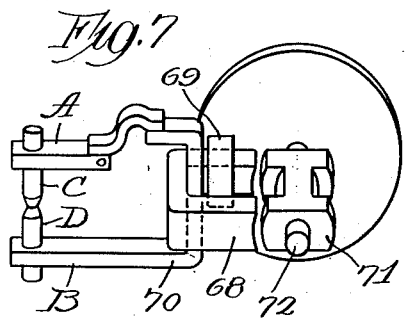
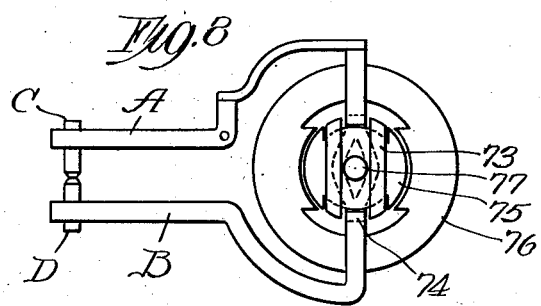
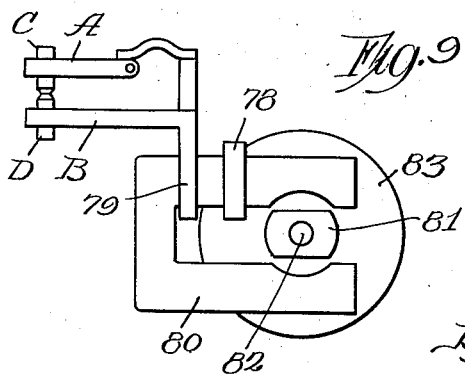
Inventor:
Freeland H. Leslie Patented Apr. 6, 1926.

1,579,721

UNITED STATES PATENT OFFICE.

FREELAND H. LESLIE, OF CHICAGO, ILLINOIS.

WELDING APPARATUS.

Application filed April 11, 1925. Serial No. 22,247.

*To all whom it may concern:*

Be it known that I, FREELAND H. LESLIE, a citizen of United States, residing at Chicago, in the county of Cook and State of Illinois, have invented certain new and useful Improvements in Welding Apparatus, of which the following is a specification.

This invention relates to electric welding apparatus.

The principal object of the invention is to provide a compact electric resistance welding machine, adapted to generate its own welding current and one which may be driven from a source of comparatively low power supply, such as a line shaft, or by a small electric motor operating on an ordinary lighting circuit.

Another object is to provide an improved type of welding generator.

An additional object is to provide welding apparatus having driven rotary elements, part of the kinetic energy of which, when the momentum thereof has reached the required value, may be transformed into an electric current of short duration but of large amperage for welding purposes.

Further objects relate to the arrangement and construction of various parts of my apparatus, which will become apparent from a consideration of the following specification and accompanying drawings, wherein Fig. 1 is a side elevation of one embodiment of my invention.

Fig. 2 is a front elevation thereof.

Fig. 3 is a detail view showing a form of rotor employed in the apparatus shown in Figs. 1 and 2.

Fig. 4 is a detailed view of a switch member, and

Figs. 5 to 9, inclusive, are diagrammatic representations of additional forms of my invention.

Referring to Figs. 1 and 2, a pedestal or support 10 is shown, having a top plate 11 carrying standards 12 within which the shaft 13 is journaled.

On one end of shaft 13 a loose pulley 14 and a tight pulley 15 are mounted by means of which the shaft may be rotated by a belt (not shown) from any source of power, such as a line shaft.

Intermediate the standards 12, the shaft 13 carries a rotor comprising an iron core 16, around which are wound the direct current field coils 17. A laminated iron yoke 19 partially embraces the rotor, as shown in Fig. 1, said yoke being clamped between plates 20 and 21 by means of bolts 22. The plates 20 and 21 may be formed integrally with the standards 12 and secured by bolts or other fastening means to the top plate 11 of the pedestal 10. On one side of the rotor, a pair of slip rings 23 is carried on the shaft 13, said slip rings being electrically connected with the field coils 17 of the rotor. On the end of shaft 13, opposite the pulleys 14 and 15, a self-excited direct current generator or exciter 24 is mounted, which may be of standard construction. Upon rotation of shaft 13, the generator 24 delivers an exciting current to the field coils 17 through the slip rings 23. A heavy flywheel 25 is also carried on the shaft, as shown. The conductor 26, in the form of a copper strap, substantially surrounds one arm of the yoke 19, said strap forming part of the secondary or welding circuit. Said strap may have more than one turn, if desired. One end of the strap is secured by a flexible lead 27 to the upper welding arm 28 through an adjustable clamp 28ª which grips said arm, and is insulated from a bracket 29 by suitable insulating material. Said bracket is secured by bolts, or the like, to said clamp and has spaced apart legs 30 which are pivoted to extensions 31 forming parts of the side plates 20 and 21.

A lower welding arm 32 is mounted on the copper bar 33, also carried by the side plates 20 and 21. Welding arm 32 may be adjusted vertically on bar 33 to accommodate material of different shapes upon which the welding operations are to be performed. This adjustment of the arm 32 may be effected by means of suitable bolts or other means, as will be obvious.

Welding arms 28 and 32 carry die points 34 and 35, respectively, between the inner ends of which the material to be operated on is placed. The bar 33 is electrically connected with the other end of strap 26, thus completing the secondary circuit.

It will be seen that when shaft 13 is rotated the exciter generator 24 will be capable of delivering a direct current to the field coils 17. The rotation of the rotor carrying the field coils will produce a rapid reversal of the magnetic flux in the core 19, thereby inducing a large current in the secondary circuit, consisting of the strap 26, flexible lead 27, clamp 28ª, welding arm 28, die points 34 and 35, and the parts to be welded between the same, arm 32 and bar 33 with which the other end of the strap 26 is connected.

In using the apparatus, the lower welding arm 32 is vertically adjusted, first, to accommodate the work in hand and power is applied through the pulley 15 to rotate the shaft. When sufficient speed of rotation has been attained the operator presses down on foot lever 36, pivoted at 37 to pedestal 10, to the opposite end of which lever a link 38 is secured. Link 38 is pivotally connected to arm 39 having a threaded stem 40 which passes through an opening in the bracket 29. An adjusting nut 41 is carried on the end of stem 40 between which nut and the bracket 29 a coil spring 42 is compressed. The forward end of arm 39 is pivoted to a central boss 43 formed on bracket 29. Downward pressure on lever 36 moves link 38 upwardly and tilts the bracket 29 upon its pivot, said bracket carrying therewith the welding arm 28, thus bringing the die point 34 into firm contact with the material resting on die point 35.

It will be seen that, until the tension of spring 42 is overcome by further downward pressure on lever 36, arm 39, bracket 29 and welding arm 28 will move upon the pivot 30ª as a unit. When the tension of the spring, however, has been overcome, further pressure on lever 36 will force the arm 39 upwardly about its pivot 39ª, thereby closing the switch, which is indicated, generally, by numeral 44. This switch closes the field circuit of the self-excited exciter generator 24 which immediately generates and delivers direct current through the slip rings 23 to the field coils 17 thus causing a flow of welding current in the welding or secondary circuit, as will be clear.

The switch 44 comprises a base 45 secured to bracket 29 and carries a pair of spaced apart pivoted contacts 46 and 47, said contacts carrying contact points 46ª and 47ª, respectively. A coil spring 48 maintains the contacts 46 and 47 normally in the position shown in Fig. 4. A flat spring 49 bears against the outer surface of contact 46, but permits the same to yield sufficiently when the contacts 46ª and 47ª are forced together by means of the lever 50, which is pivoted at 51 to the arm 39 when the lever 36 is depressed. A pin 52 acts as a stop for the lever 50 against which the latter is maintained by coil springs 53 when the switch is open.

It will be seen that when the resistance of spring 42 has been overcome and arm 39 begins to move independently about its pivot 39ª that lever 50 will be carried upwardly into contact with lug 47ᵇ, and thus move contact 47 to the left, as viewed in Fig. 4, until the contact point 47ª presses against the contact point 46ª, thereby closing the circuit of the self-excited field of the exciter generator. It will be understood, of course, that the members above referred to will be suitably insulated to prevent short circuiting.

It will be apparent that the above described machine may be driven by means of a small motor, or other source of power and that the inertia of the rotating members, including the fly-wheel 25, will be sufficient to cause a momentary surge of heavy current through the secondary circuit when the switch 44 is closed upon depressing the lever 36. The lever 50, upon further upward movement of arm 39, snaps over the lug 47ᵇ, thereby opening the circuit, but is returned to the normal position shown in Fig. 4 upon releasing the lever 36 by virtue of the action of spring 42, as will be clear, the spring 53 permitting the lever 50 to snap over the lug 47ᵇ, without closing the switch.

In Figs. 5 to 9, inclusive, a pair of welding arms A and B are provided carrying die points C and D, respectively, which may be made adjustable in the manner above described, and with which a suitable switch may be employed for energizing the exciting circuit in the manner previously described, the said modifications differing from the form above described only in the arrangement of the current generating means. In Fig. 5, the rotor, indicated, generally, by numeral 55, carries a direct current field winding 56. The secondary or welding circuit has two sides 57 and 58, each of which is in a slot 57ª and 58ª, respectively, of the stationary circular armature 59. A fly-wheel 60 is carried on the shaft 61, upon which the rotor 55 is also mounted.

In Fig. 6, an external circular revolving field 62 acts as a fly-wheel, is carried by the shaft 63 and has two field poles 64 and 65, each with field windings carrying direct current. A stationary internal armature 66 is provided which carries a welding circuit coil 67 with its two sides, each of which is in a slot on opposite sides of the armature. A source of direct current, such as from an exciter generator, may be provided in connection with each of the above described modifications, whereby a large current will be induced in the secondary circuits, as will be clear.

In Fig. 7, a stationary yoke 68 is provided, which yoke passes through a direct current field coil 69 and a secondary or welding circuit coil 70. A steel armature 71 is mounted on shaft 72 adjacent the ends of the yoke 68. Rotation of the armature 71 varies the reluctance of the magnetic path so that when direct current flows through the coil 69 a large current is induced in the secondary coil 70. A fly-wheel is mounted on shaft 72.

In Fig. 8, field coils 73 and welding circuit coil 74 are mounted on the inner stationary core 75. The outer circular armature 76 revolves on shaft 77, thus varying the reluctance of the magnetic path so that when current is admitted to the field coils, a welding current is induced in the secondary or welding circuit. The outer circular armature 76 serves as a fly-wheel in this construction.

In Fig. 9, field coils 78 and welding circuit coil 79 are mounted on yoke 80. An armature 81 is mounted on shaft 82 and is rotated adjacent the ends of the yoke 80 thereby varying the reluctance of the magnetic path between the yoke so that when direct current is admitted to the field coil 78 a welding current is induced in the secondary or welding circuit. A fly-wheel 83 is also mounted on the shaft 82.

In all the above welder modifications, the intensity of the welding current may be varied by means of a variable resistance or rheostat connected in the self-excited field circuit of the exciter generator, or the variable resistance may be connected in series with the field coils of the welder.

In any of the above welder modifications, the fly-wheel continues to revolve without stopping during a sequence of any number of welds. As each weld is made it slows down the fly-wheel speed slightly taking a fraction of kinetic energy thereof, but before a subsequent weld is made, the fly-wheel has regained its normal speed.

Between successive welds, the fly-wheel continues to revolve without any loss of power other than friction as there is no core or iron loss in the welder proper, due to the fact that there is no excitation at that time. Core loss in the exciter generator is eliminated during such periods by using the switch for opening the self-excited field of the exciter generator. Hence, the fly-wheel and the rotor may be revolved at normal speed when not welding, with a minimum application of power, and these parts are thus ready at all times to deliver a part of the kinetic energy for welding purposes.

Although I have shown various modifications of my improvements for purposes of illustration, it will be understood that the invention is not limited to the specific embodiments described herein, as various changes may be made, within the scope of the invention. For example, the exciting current may be supplied from some external source of direct current. Also control of the welding current may be accomplished by locating the switch 44 in series with the circuit comprising field coils 17, slip rings 23 and exciter generator 24, which may be self-excited, or be excited from an external source. Various mechanical and structural changes may also be made within the scope of the appended claims.

What I claim as new is:

1. An electric resistance welding machine comprising a welding circuit, a conductor therein having welding dies in series therewith, an electrically excitable rotatable member associated with said circuit, and means for exciting said member when rotating whereby the kinetic energy thereof will be transformed simultaneously with the excitation of said member into a large momentary current in said welding circuit.

2. An electric resistance welding machine comprising an iron yoke, a secondary coil thereon having welding clamps in series therewith, a rotatable member comprising field coils and core mounted adjacent the ends of said yoke, said rotatable member having inertia sufficient to store a large amount of kinetic energy when rotating rapidly, a source of direct current, and a switch for admitting energizing current from said source to said field coils for energizing the same when said member is rotating, whereby the kinetic energy of said rotating member is transformed into a large current in said secondary coil.

3. An electric resistance welding machine comprising an iron yoke, a conductor thereon having welding dies in series therewith, a rotatable generator member mounted adjacent the ends of said yoke adapted when excited to induce alternating magnetism therein, means for rotating said rotatable member, said rotatable member comprising field coils, an iron core and a fly-wheel for storing kinetic energy in the rotatable member when same is rotating, exciting means for energizing said coils whereby the kinetic energy of said rotating member is transformed into a large current in said conductor for welding purposes, and means for regulating the intensity of the welding current.

4. An electric resistance welding machine having an iron yoke, a secondary coil thereon having welding dies in series therewith, a rotatable member mounted adjacent the poles of said yoke, said member comprising a core, coils and fly-wheel, means for rotating said member, and means for electrically exciting said coils to induce rapidly alternating flux in said yoke whereby part of the kinetic energy of said member is transformed into a large induced momentary current in said secondary coil.

5. A welding machine comprising a supporting structure, a normally non-inductive generator thereon having a rotor of large inertia, a pair of welding arms, die points carried thereby, one of said arms being pivotally mounted, a lever operable to move said arm in a direction to press the die point thereof against the article being welded, and a switch controlled by said arm for admitting exciting current to said generator whereby the kinetic energy of said rotor is transformed into a large momentary current adapted to flow through said die points.

6. A welding machine comprising a generator normally non-inductive adapted to be actuated to build up kinetic energy in the rotating parts thereof, a welding circuit associated with said generator, and means for rendering said generator inductive whereby part of said kinetic energy is transformed into a large momentary current at the instant welding current is desired.

7. In a device of the class described, a pedestal, bearings supported thereon, a shaft rotatably mounted in said bearings, a rotatable field, an exciter and a fly wheel mounted on said shaft, a laminated yoke mounted on said pedestal and partially surrounding said rotatable field, welding arms supported by said pedestal, and a strap passing through a slot in said yoke and having parallel lengths embracing said yoke, and electrical connections from said exciter to said field and from said strap to said arms, whereby a compact self-contained resistance welding outfit is provided.

8. The method of providing a current for welding purposes which consists in rapidly rotating one of two members in the presence of the other, one of which members is provided with a direct current coil, admitting current to said coil, after the momentum of said rotating member has reached a predetermined value, and at the instant welding current is desired, to induce rapidly alternating magnetism in the stationary member, and employing the magnetism of said member to induce a large momentary current in a welding circuit, having welding dies in series therewith.

9. The method of providing an electric current for welding purposes which consists in building up kinetic energy in an electrically excitable rotary member, exciting said member at the instant welding current is desired, whereby the kinetic energy of said member is transformed into a momentary current of large amperage, and conducting said current through a welding circuit having welding dies in series therewith.

In testimony whereof, I have subscribed my name.

FREELAND H. LESLIE.